A. KIMBLE & J. D. NIES.
SYNCHRONOUS MOTOR.
APPLICATION FILED JAN. 2, 1914.
1,217,187.
Patented Feb. 27, 1917.
2 SHEETS—SHEET 1.
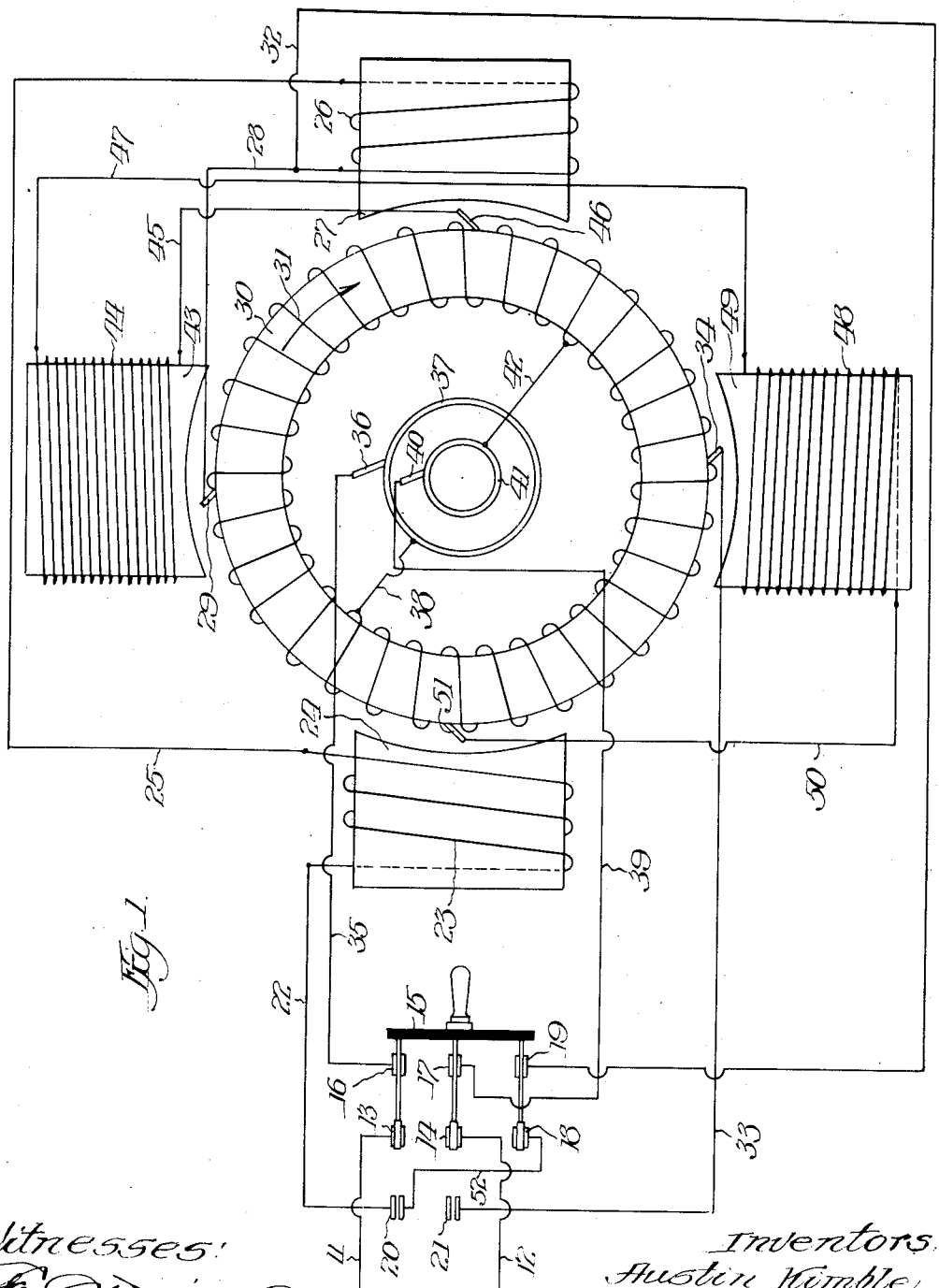

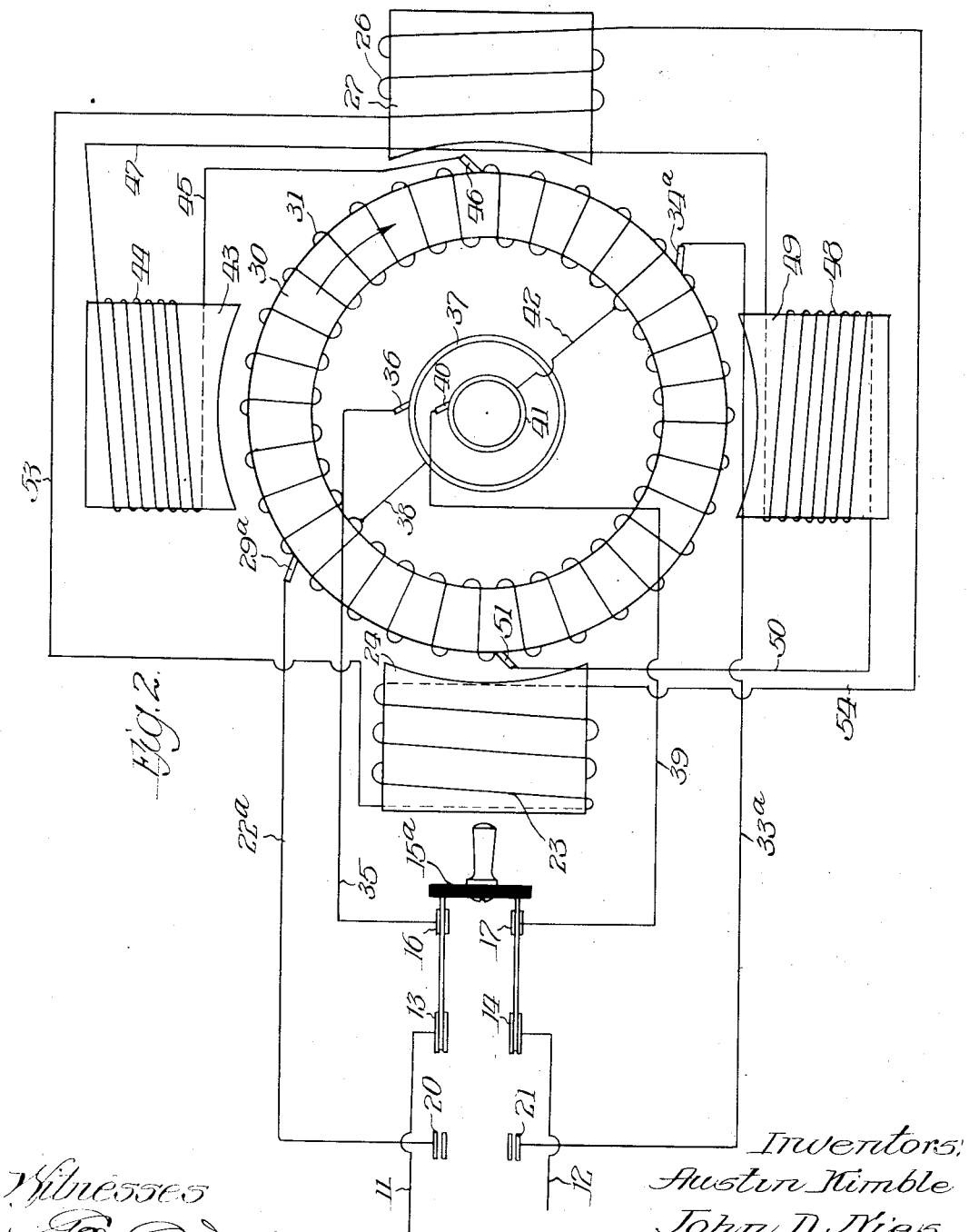

UNITED STATES PATENT OFFICE.

AUSTIN KIMBLE, OF CHICAGO, AND JOHN D. NIES, OF ST. CHARLES, ILLINOIS, ASSIGNORS TO KIMBLE ELECTRIC COMPANY, OF CHICAGO, ILLINOIS, A CORPORATION OF ILLINOIS.

SYNCHRONOUS MOTOR.

1,217,187.  Specification of Letters Patent.  Patented Feb. 27, 1917.

Application filed January 2, 1914. Serial No. 809,862.

*To all whom it may concern:*

Be it known that we, AUSTIN KIMBLE, residing at Chicago, in the county of Cook and State of Illinois, and JOHN D. NIES, residing at St. Charles, Kane county, Illinois, both citizens of the United States, have invented certain new and useful Improvements in Synchronous Motors, of which the following is a specification.

Our invention relates to synchronous motors, and refers particularly to synchronous motors and converters of single phase or polyphase type which are self-starting by means of alternating current.

It is well known that heretofore some difficulty has been experienced in providing suitable means for starting synchronous motors from an alternating current source. While such machines operate satisfactorily after synchronous speed has been reached, the electrical connections which serve to maintain the rotor at synchronous speed are not adapted to start the rotor from rest, and for this reason some means of starting must be provided.

The circuits of a synchronous motor and converter include:

(*a*) An armature winding consisting of a plurality of coils connected to a multi-segmental commutator, from which in the normal operation of the machine direct current may be obtained. The brushes that bear on this commutator are known as the direct current brushes. At suitable points in the armature winding connections are made to a number of slip rings, and the brushes bearing on these rings are known as the alternating current brushes.

(*b*) A stator winding consisting of a relatively large number of turns and adapted to receive a portion of the direct current obtained from the commutator, and therewith to magnetize the fields. This winding is known as the direct-current field winding.

(*c*) In some cases a damper winding actually or in effect embedded in slots in the stator poles. This winding is intended to prevent "hunting."

(*d*) In some cases a special stator winding consisting of a relatively small number of turns of relatively heavy conductor, this winding being in use only during the starting of the machine. In some cases this winding is used as a series direct-current field winding for the purpose of compounding the machine when in operation.

There are three leading methods which have been heretofore used in starting synchronous motors:

(1) The machine may be started with the assistance of an auxiliary motor.

(2) The starting may be accomplished through a temporary reorganization of the machine circuits, so that the machine starts in the same manner as an induction motor.

(3) The circuits may be reorganized so as temporarily to change the machine to an alternating current commutator motor, so that the machine starts as a series alternating current motor, as a repulsion motor, or some similar type.

The disadvantage of these methods of starting will be considered in some detail, as it is the object of our invention to eliminate such disadvantages.

(*1*) *Starting by an auxiliary motor.*— This method is too complicated for commercial use in the hands of unskilled persons. It adds considerably to the installation cost. The starting torque obtainable is just sufficient positively to start the synchronous machine without load. To start against full load torque would demand an auxiliary motor of nearly the same rating as the synchronous machine.

(*2*) *Starting as induction motor.*—In this plan which is available only for polyphase machines, the alternating current usually at reduced voltage is admitted through the usual slip rings to the armature, and causes a revolving magnetic field to appear in the latter. This revolving magnetic field cuts the iron of the pole faces of the stator field poles, and also cuts the conductors composing the damper winding, if one is present, and the current so generated in the pole faces or damper winding causes a torque to be exerted (by reaction with the alternating current in the armature) of sufficient amount to cause rotation of the rotor. This same revolving magnetic field of the armature also cuts the turns of wire composing the direct-current field winding and causes an E. M. F. to be induced in these field coils. Since the number of turns of wire in these coils is comparatively very great the E. M.

F. so induced in them is relatively very high, so much so as to endanger the insulation of the coils. To reduce this danger it has hitherto been customary to provide what is called a "field break-up" switch which is open during the starting process, thereby dividing up the field winding circuit into a plurality of small parts, the voltage of any one of which is not so high as to endanger the insulation. There is little objection to this plan of breaking up the field circuit when the machine is handled by skilled persons, but it cannot be considered satisfactory when the machine must be handled by unskilled persons as in commercial use. And even with the field circuit broken up the voltage induced in a single coil may be high enough to be a source of danger to the insulation and also to life.

The disadvantages of this plan are:

Relatively large starting current.

Extremely poor starting torque. It is impossible to start a loaded machine in this way.

Production of high voltage in the direct-current field winding.

Necessity of subdividing the direct-current field winding.

*(3) Starting as commutator alternating current motor.*—In this plan, which can be used on single phase or polyphase machines, single phase current is conducted through the armature by means of the commutator, and also through a special stator field winding coaxial with the direct-current field winding. The direct-current field winding is not in use during the starting period. The special stator field winding produces an alternating field, and this field through interaction with the alternating current in the armature conductors produces torque exactly as in any series motor. But the magnetism produced by the special stator winding also cuts the turns of wire composing the direct-current field winding, the two windings being coaxial, and induces in the latter a comparatively high voltage, and it is impossible to avoid the generation of this high voltage because the magnetism that generates it is indispensable for the production of torque. The danger resulting from the presence of this high voltage may be reduced as in the first method of subdividing the direct-current stator winding into a number of small parts, but it cannot be wholly eliminated.

The disadvantages of this plan are:

Either the production of high voltage in the direct-current field winding, unless that winding is short-circuited, or low value of starting torque, unless that winding is not short-circuited. Necessity of subdividing the direct-current field winding.

Therefore, it is apparent that in methods (2) and (3) it is the high voltage induced in the direct-current field winding that is the principal source of trouble in starting synchronous motors from a source of alternating current. Could this winding be short-circuited during the starting process this difficulty would be eliminated, but the short-circuiting would cause the rotor to lock and refuse to start in method (2), and in method (3) the short-circuiting would prevent the generation of magnetism by the special stator field coils and would thus prevent the production of starting torque.

One of the objects of our invention is to avoid the difficulties referred to by providing an improved construction of synchronous motor having the advantages of high starting torque, and excitation of its field during the synchronous running condition by means of current supplied from the armature of the motor through proper commutating devices without the generation of a high E. M. F. in its direct current field winding during the starting condition. Other objects of our invention will appear more fully in connection with the description of the drawings.

These and other advantages of our invention will be more readily understood by reference to the accompanying drawings, in which—

Figure 1 is a diagrammatic representation of a two-pole model of our improved synchronous motor and converter and the connections used therewith.

Fig. 2 is a diagrammatic representation of a two pole synchronous motor and converter and its connections, but showing a modified form of construction.

Referring to Fig. 1, alternating current is supplied from a suitable source through the conductors 11 and 12 and the switch contacts 13 and 14. The switch 15 is provided with suitable blades, which afford electrical connection between the contact members 13 and 16, 14 and 17 and 18 and 19 when the switch 15 is in one position and between the contacts 13 and 20 and 14 and 21 when the switch is in its alternate position.

A conductor 22 leads from the contact 20 to the winding 23 of the starting pole piece 24 of the starting field magnet, and a conductor 25 leads from the opposite end of the field winding 23 to the winding 26 of the starting pole piece 27 located opposite to the starting pole piece 24. A conductor 28 leads from the opposite end of the winding 26 to the starting brush 29, which engages the commutator of the armature 30, provided with the armature winding 31.

The conductor 32 leads from the conductor 28 to the switch contact 19.

The conductor 33 leads from the contact 21 to the starting brush 34, which engages the commutator of the armature 30 at a point opposite the brush 29.

The conductor 35 leads from the switch contact 16 to the brush 36 engaging the slip ring 27, which in turn is connected with the armature winding 31 by the conductor 38.

The conductor 39 leads from the switch contact 17 to the brush 40, engaging the slip ring 41, which is connected to the armature winding 31 by means of the conductor 42 at a point opposite to that at which the conductor 38 is connected to the armature winding.

The pole piece 43 of the operating or direct-current field magnet is provided with the winding 44, of a relatively large number of turns, and connected with one end of the winding 44 is the conductor 45, which leads to the operating or direct-current brush 46, engaging the commutator of the armature 30 at a point in line with the starting pole piece 27. The conductor 47 leads from the opposite end of the winding 44 to one end of the winding 48 of the pole piece 49 of the operating field magnet; the winding 48, like the winding 44, having a relatively large number of turns. The conductor 50 leads from the opposite end of the winding 48 to the operating or direct-current brush 51, engaging the commutator of the armature 30, this brush being located opposite to the brush 46.

It will be apparent that in our improved motor, the starting field magnet is displaced in space an angle of substantially ninety electrical degrees from the operating field magnet, and in the form of motor shown in Fig. 1 the starting brushes are similarly displaced in space an angle of substantially ninety electrical degrees from the operating brushes.

It is to be understood that throughout the drawings the construction of the armature and pole pieces is shown diagrammatically and without attempting to indicate the complete commercial construction of the machine, since the manner of constructing armatures of this kind and field magnets for use in connection with said armatures is well known in the art and may be done in a wide variety of ways, which, as they do not constitute in themselves novel features of our invention, are not particularly shown and described; thus, for example, the field poles are not shown provided with a return magnetic path connecting their outer ends, as is usually the case in commercial construction, but it will be understood that such return paths are provided in the actual construction of our machine in any desired manner within the knowledge of the art, and, furthermore, the operating magnetic poles may be provided with such a metallic return path in common with the starting poles, or each set of poles may have its independent magnetic return path if preferred. The operation of our improved construction is the same in either event, and as far as our present invention is concerned, it is immaterial which construction is employed.

In the case of the repulsion motor shown in Fig. 2, in starting, the switch 15ᵃ is thrown to the left, thereby directly including the armature winding 31 in circuit with the mains 11 and 12 through conductors 22ᵃ and 33ᵃ and starting brushes 29ᵃ and 34ᵃ.

Having thus described the various parts and electrical connections used for our improved motor, we will next describe the operation of the same:

Taking first the construction shown in Fig. 1, when it is desired to start the motor, the switch 15 is moved into the position in which the contacts 13 and 14, on the one hand, are connected with the contacts 20 and 21 on the other. Alternating current thus flows from the conductor 11, through the conductor 22, the winding 23, conductor 25, the winding 26, conductor 28, starting brush 29, armature winding 31, starting brush 34, and conductor 33, back to the conductor 12, thereby completing the circuit. At the same time the windings 44 and 48 are short-circuited with each other through conductor 45, operating brush 46, armature winding 31, operating brush 51 and conductor 50, on the one hand, and conductor 47 on the other. Under these conditions the motor acts as a series inductively compensated motor. The armature 30 is rotated with gradually increasing speed in the direction indicated by the arrow in Fig. 1. The windings 44 and 48 being short-circuited on each other, electromotive force of more than a very small voltage is effectually prevented from being built up, thus preventing danger of burnout and danger to life, while, at the same time this short-circuiting serves to prevent the armature from generating a magnetic field in line with the starting brushes 29 and 34. The result of this is that the current flows freely through the armature winding 31 and an effective torque is built up.

In the modified form of construction shown in Fig. 2, the motor is started as a repulsion motor. In order to do this the windings 23 and 26 are permanently short-circuited on each other through the conductors 53 and 54 and the starting brushes 29ᵃ and 34ᵃ are displaced from the operating brushes 51 and 46 by something less than ninety electrical degrees. The brush 29ᵃ is connected with the contact 20 by the conductor 22ᵃ, and the brush 34ᵃ is connected with the contact 21 by the conductor 33ᵃ. In this form of motor the switch 15ᵃ has only two blades, as the contacts 18 and 19, and the conductors connected therewith, are unnecessary. Except for the differences just pointed out, the other features of construction of the motor shown in Fig. 2, and the connections used with said motor, are the same as those shown in Fig. 1.

When the armature attains approximately synchronous speed, the switch 15 or 15ª, as the case may be, is thrown into the position indicated in Fig. 1 or Fig. 2. The motors shown in Figs. 1 and 2 now operate in exactly the same manner. The alternating current now flows from the conductor 11 through the conductor 35, brush 36, slip ring 37, conductor 38, armature winding 31, conductor 42, slip ring 41, brush 40, conductor 39 back to the conductor 12, thereby completing the circuit. At the same time unidirectional current is taken by means of the operating brushes 46 and 51 from the armature winding 31, this uni-directional current passing, in the first instance, from the brush 46 through the conductor 45 and the winding 44, thereby energizing the pole piece 43 of the operating field magnet with a magnetism of a fixed polarity, and then passing through conductor 47 to the winding 48, and thence through conductor 50 to the brush 51, thereby completing the circuit with the armature winding 31, and energizing the pole piece 49 with a magnetism of a fixed polarity opposite to that of the pole piece 43.

When the switch 15 is moved into the position shown in Fig. 1, the windings 23 and 26 of the pole pieces 24 and 27 of the starting field magnet are short-circuited upon each other through the conductor 25 on the one hand, and the conductors 22, 52, 32 and 28 on the other.

In the operation of the motor the pole pieces 43 and 49 of the operating field magnet, as previously described, are magnetized by current taken from the operating brushes 46 and 51, the brushes being of the usual type used in rotary converters. If desired, a rheostat may be placed in series with the windings 44 and 48 in order to regulate the strength of the current flowing through these windings, thereby controlling the power factor of the current supplied to the slip rings 37 and 41. For the sake of simplicity, in connection with this application no rheostat is shown, and the power factor is assumed to be 100%.

The magnetism generated at the pole pieces 43 and 49 of the operating field magnet causes an electromotive force to be generated in the armature 30, by reason of the latter's rotation, and this electromotive force appears at the operating brushes 46 and 51. On the other hand, the magnetism generated in the pole pieces 24 and 27 of the starting magnets gives rise, by the armature's rotation, to an electromotive force which appears at the starting brushes 29 and 34, or 29ª and 34ª.

From the foregoing it will be evident that, provided the windings 23 and 26 are not closed or short-circuited on each other, and provided the magnetic reluctance is constant at all points around the armature, a quantity of magnetism, the value of which varies in accordance with the armature position, is generated at the pole pieces 24 and 27. On the other hand, if the windings 23 and 26 are short-circuited on each other, as is the case in actual operation, the pulsating magnetism induces an electromotive force in the windings 23 and 26, and this electromotive force causes a current to flow, the direction and value of this current being such at any instant as will oppose and prevent the pulsation of the magnetism.

It is a law of electromagnetism that in a short-circuited coil any attempt to vary the magnetism passing through the coil is resisted by a current generated in the coil by the attempt to change the magnetism. Thus in an ideal short-circuited coil the magnetism produced by the current in the coil cannot change. In an actual coil possessing resistance and reactance a certain electromotive force is required to cause the current to flow, and the magnetism produced by the coil departs from constancy sufficiently to produce this necessary electromotive force.

The joint effect of the current passing through the windings 23 and 26 and of the current in the armature is to maintain a nearly constant value of magnetism at the pole pieces 24 and 27, and this causes a direct-current voltage to appear at the starting brushes 29 and 34, or 29ª and 34ª, the value of which depends upon the particular design of the motor, as for example the number of conductors of the armature winding, and also varies according to the load. The relative voltages of the current generated at the starting brushes 29 and 34, or 29ª and 34ª, on the one hand, and the operating brushes 46 and 51, on the other depend on the relative magnetic fields formed at the starting and operating field magnets, and the position of the starting brushes. It will be further evident that, if desired, an auxiliary direct-current field winding could be used on each of the pole pieces 24 and 27, thereby further controlling the voltage at the starting brushes 29 and 34 or 29ª and 34ª.

From the foregoing description it will appear that the objects of our invention briefly referred to above are realized and consist more specifically in securing all of the advantages of a series-wound and connected motor during the starting of the rotor and all of the advantages of the compensated type of machine during synchronous operation, at the same time eliminating the disadvantages of the series motor during full speed running conditions and the disadvantages of the compensated type of machine during starting. This we accomplish by providing the rotor with a commutator connected with the rotor winding in the manner common in synchronous motors, and upon the commutator a first set of brushes is provided which is connected with the terminals of the main energizing winding of the stator to secure an operation of the motor during its running condition similar to that found in self-exciting synchronous motors. This main field winding is preferably of high resistance and impedance, and consists preferably of a large number of turns of relatively fine wire. We also provide an auxiliary or compensating stator field winding displaced at substantially ninety (90) electrical degrees from the main field winding, and consisting preferably of a few turns of relatively large wire, which compensating field winding is short-circuited during the running condition of the motor so that it operates substantially as compensating field windings heretofore used in the art. By our invention, however, we secure an entirely new mode of operation of the motor during the starting relation by providing the commutator with a second set of brushes displaced at an angle electrically from the first set of brushes, this second set of brushes being within the field of the main field winding and serving during the starting relation to supply the rotor winding with alternating current. The compensating field winding may be connected in series with the second set of brushes or not, as desired, during the starting relation, and when thus connected, which we think is the preferable arrangement, a series single-phase alternating current motor is the result, the compensating field winding being the flux producing winding for this condition and the main field winding being a compensating winding, and inasmuch as the brushes connected with the main field winding are located upon the commutator at points of substantially equal potential during the starting relation, this winding is substantially short-circuited through the low resistance rotor winding at that time to effectively constitute the main field winding a compensating winding. This it will be seen prevents the building up of an excessive electromotive force in the main field winding during the starting relation, and the only current flowing through the main field winding at that time is that required to oppose and choke the magnetic flux, which would otherwise be set up by the rotor windings along the axis of the starting brushes, practically no current being supplied to the main field winding at this time from the rotor winding since, as above stated, the set of brushes connected with the main field winding bears upon the commutator at points of substantially equal potential.

This result is to be carefully distinguished from constructions in which a low resistance winding is connected across a pair of brushes set at substantially 90 electrical degrees from the starting brushes, since in that case the low resistance winding would short circuit the rotor along the axis at substantially 90 electrical degrees from the starting brushes which would have the effect of preventing the passage of an appreciable amount of starting magnetic flux through the armature along this axis, whereas in our construction we secure the opposite result—that is to say, the rotor is in effect open circuited along the above named axis which has the effect of permitting a perfectly free passage of the starting magnetic flux through the rotor along this axis.

The entire function, therefore, of the main stator field winding during the starting relation is to serve as a compensating winding without in any way modifying the starting current flowing through the armature, except as such compensating action opposes and chokes the magnetic flux which would otherwise be produced by the transformer action of the armature along the axis of the starting brushes. With the compensating stator winding connected in series with the rotor during the starting relation, the operation is therefore that of a series single-phase alternating current motor freed from objectionable conditions due to armature induction at the starting brushes, thus securing during the starting relation the advantage of the relatively large torque produced by a series motor which rapidly brings the rotor up to synchronous speed. When synchronous speed is reached the alternating current is supplied directly to fixed points of the rotor winding by means of slip rings, and connection with the starting brushes is interrupted, with the result that the axis of magnetic flux from the stator is moved substantially 90 degrees, the main stator winding now becoming the flux producing winding as a result of its energization by uni-directional current supplied to it from the brushes located upon the rotor commutator with which brushes said main field winding is connected. At the same time that the alterating current main conductors are connected with the slip rings, the compensating stator winding is short-circuited upon itself so that during the synchronous running of the motor the compensating winding serves to oppose and choke the induced magnetic flux, which would otherwise be set up by transformer action by the rotor windings along the axis of the brushes connected with the main stator winding. In this way all of the advantages of high torque and constant speed during the running condition are secured.

From the above it will be seen that by our construction when one of the stator windings is operating as a magnetic field producing winding for driving the rotor, the other stator winding operates as a compensating winding, and that the brushes located upon the rotor commutator, which are at any time operative are located in a compensating field, so that commutating conditions are properly maintained both during the starting and running conditions of the rotor.

By the terms "starting field magnet" and "operating field magnet" as used in the claims, we mean the field magnet for producing the torque producing flux for the starting condition of the rotor or armature and the magnet for producing the torque producing flux for the synchronous running condition of the rotor or armature respectively. Similarly the terms "starting" and "running" as used in the claims mean starting condition and the synchronous running condition respectively of the rotor or armature and the term "operating" where used as a qualifying term in the claims means that the part so qualified is effective during the synchronous condition of the rotor or armature.

It will be apparent to those skilled in the art that many changes could be made in the details of the parts we have described without departing from the spirit or scope of the invention.

What we claim is:

1. In a synchronous motor, the combination with a source of alternating current, of an armature having a commutator and slip rings thereon, a starting field magnet having winding thereon for producing magnetic flux through said armature during the starting condition, means for connecting said winding and said armature, through its commutator, in series with said source, means for connecting said armature, through its slip rings, with said source, an operating field magnet displaced in space substantially ninety electrical degrees from said starting field magnet and having a winding thereon for producing magnetic flux through said armature during the running condition, means connecting the winding of said operating field magnet in circuit with said armature through the commutator of the latter, and means for short-circuiting the winding of said starting magnet when said winding is not connected with said source, whereby, during the connection of said source with the winding of said starting magnet and said armature through its commutator, the winding of said operating magnet will be short-circuited on itself and during the connection of said source with said armature through said slip rings, the winding of said operating magnet will be supplied with direct current from said armature, substantially as described.

2. In a synchronous motor, the combination with a source of alternating current, of an armature having a winding, a commutator and slip rings thereon, a starting field magnet having a winding thereon for producing a magnetic flux through said armature during the starting condition, a set of starting brushes engaging the commutator of said armature and adapted to be connected with the winding of said starting magnet, means for connecting the windings of said starting magnet and said armature through said starting brushes and said commutator in series with said source, an operating field magnet having a winding thereon for producing a magnetic flux through said armature during the running condition and displaced in space substantially ninety electrical degrees from said starting field magnet, a set of direct-current brushes engaging the commutator of said armature and connected with the winding of said operating magnet, said brushes being displaced in space at an angle from said starting brushes, means for connecting said armature winding with said source through said slip rings, and means for short-circuiting on itself the winding of said starting magnet, whereby, when the windings of said starting magnet and armature are connected through said commutator and starting brushes with said source, said armature will be rotated and the winding of said operating magnet will be short-circuited on itself through said armature winding, and when said armature winding is connected with said source through said slip rings and the winding of said starting magnet is short-circuited on itself, said operating magnet will be energized to produce a magnetism of a fixed polarity, and direct current of a plurality of voltages will appear at said starting and operating brushes, substantially as described.

3. In a synchronous dynamo electric machine, the combination of an armature, a winding carried by the armature, connectors for conducting alternating current to and from said winding, a commutator connected with said winding, an operating field magnet having a winding for producing a magnetic flux through the armature during the running condition, an auxiliary field magnet having a winding for compensating for armature induction, operating brushes on the commutator connected with the winding of the operating field magnet and located in the field of the auxiliary field magnet, starting brushes on said commutator displaced substantially 90 electrical degrees from said operating brushes, and means for connecting said starting brushes with alternating current main conductors and with the winding of said auxiliary field magnet during the starting of the armature and for interrupting the connection with said main conductors and establishing a low resistance connection between the terminals of the winding of said auxiliary field magnet during the running condition of said armature.

4. In a synchronous dynamo electric machine, the combination of an armature, a winding carried by the armature, connectors for conducting alternating current to and from said winding, a commutator connected with said winding, an operating field magnet having a winding for producing a magnetic flux through the armature during the running condition, an auxiliary field magnet having a winding for compensating for armature induction, operating brushes on the commutator connected with the winding of the operating field magnet and located in the field of the auxiliary field magnet, starting brushes on said commutator displaced substantially 90 electrical degrees from said operating brushes, means for connecting said starting brushes with alternating current main conductors and with the winding of said auxiliary field magnet during the starting of the armature and for interrupting the connection with said main conductors and establishing a low resistance connection between the terminals of the winding of said auxiliary field magnet during the running condition of said armature, and devices for connecting the armature winding directly with said main conductors during the running condition of the armature.

AUSTIN KIMBLE.
JOHN D. NIES.

Witnesses:
HENRY M. HUXLEY,
HELEN JACOBS.